(12) United States Patent
Bauer et al.

(10) Patent No.: US 12,083,988 B2
(45) Date of Patent: Sep. 10, 2024

(54) DRIVE DEVICE FOR A VEHICLE FLAP

(71) Applicant: Edscha Engineering GmbH, Remscheid (DE)

(72) Inventors: Manfred Bauer, Remscheid (DE); Sergej Steigerwald, Remscheid (DE); Heinrich Ackers, Remscheid (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 0 days.

(21) Appl. No.: 18/234,018

(22) Filed: Aug. 15, 2023

(65) Prior Publication Data

US 2024/0059246 A1   Feb. 22, 2024

(30) Foreign Application Priority Data

Aug. 19, 2022   (DE) ..................... 10 2022 121 058.8

(51) Int. Cl.
| | |
|---|---|
| *B60R 21/38* | (2011.01) |
| *E05D 3/12* | (2006.01) |
| *E05F 15/00* | (2015.01) |

(52) U.S. Cl.
CPC ............. *B60R 21/38* (2013.01); *E05D 3/125* (2013.01); *E05F 15/00* (2013.01); *E05Y 2201/626* (2013.01); *E05Y 2800/102* (2013.01); *E05Y 2800/252* (2013.01); *E05Y 2800/746* (2013.01); *E05Y 2900/536* (2013.01)

(58) Field of Classification Search
CPC ... B60R 21/38; B60R 21/34; B60R 2021/343; E05D 3/125; E05F 15/00; E05Y 2201/626; E05Y 2800/102; E05Y 2800/252; E05Y 2800/746; E05Y 2900/536

See application file for complete search history.

(56) References Cited

U.S. PATENT DOCUMENTS

| | | | |
|---|---|---|---|
| 2006/0131086 A1* | 6/2006 | Lutter ..................... | B60R 21/38 180/69.21 |
| 2016/0264185 A1* | 9/2016 | Keller .................... | B62D 25/12 |

FOREIGN PATENT DOCUMENTS

| | | | | |
|---|---|---|---|---|
| DE | 102013017453 A1 * | 4/2015 | ............ | B60R 21/38 |
| DE | 102014014085 A1 * | 2/2016 | ............ | B60R 21/38 |
| WO | WO-0069703 A1 * | 11/2000 | ............ | B60R 21/34 |

* cited by examiner

*Primary Examiner* — Amy R Weisberg
*Assistant Examiner* — Matthew D Lee
(74) *Attorney, Agent, or Firm* — Davidson Kappel LLC

(57) ABSTRACT

A drive device for a vehicle flap, includes a flap part assigned to a vehicle flap, a body part assigned to a vehicle body, a joint arrangement connecting the flap part and the body part in an articulated manner, a first actuator coupled to the joint arrangement for opening and closing the vehicle flap during conventional operation, a second actuator coupled to the joint arrangement for lifting the vehicle flap into a pedestrian protection position, a coupling device for coupling the first actuator and the second actuator, wherein the coupling device comprises a first lever and a second lever, wherein the first lever is assigned to the first actuator, and wherein the second lever is assigned to the second actuator. A reliable and compact drive device is provided in that during conventional operation, the first lever and the second lever are connected to one another in a rotationally fixed manner via a mechanical securing element.

22 Claims, 7 Drawing Sheets

_DRIVE DEVICE FOR A VEHICLE FLAP_

The present disclosure relates to a drive device for a vehicle flap.

BACKGROUND

In practice, drive devices for vehicle flaps are known which, during conventional operation, allow a front flap to be opened and closed via a first actuator between a closed and an open position for maintenance of the vehicle or for receiving or removing luggage.

In addition, it is known that the drive device can also be used for implementing a pedestrian protection and, for this purpose, comprises a second actuator which, in the event of a collision with a pedestrian, immediately brings the front flap into a lifted pedestrian protection position in order to provide a deformation space in an area of the vehicle front. This prevents the pedestrian's head in particular from striking the hard motor block arranged under the front flap without deceleration.

Due to the fact that the vehicle flap is abruptly displaced in the event of a collision, the deployment of the vehicle flap must in no way be delayed or even blocked. In general, a particularly fast-acting second actuator, often in the form of a pyrotechnic actuator, is provided for driving the vehicle flap into this pedestrian protection position. A problem with the combination with a first actuator configured for conventional operation, which is intended for conventional opening and closing of the front flap, is that due to the coupling of the two separately provided actuators via the vehicle flap or via the vehicle body, a delay or even a partial blocking of the deployment movement into a collision state of the drive device may occur due to the first actuator.

DE 10 2014 014 085 A1 shows a drive device for a deployable vehicle flap, comprising a flap part assigned to a vehicle flap, a body part assigned to a vehicle body, a joint arrangement connecting the flap part and the body part in an articulated manner, a first actuator coupled to the joint arrangement for opening and closing the vehicle flap during conventional operation, a second actuator coupled to the joint arrangement for lifting the vehicle flap into a pedestrian protection position. Furthermore, a coupling device for coupling the first actuator and the second actuator is shown, wherein the coupling device comprises a first lever and a second lever, wherein the first lever is assigned to the first actuator, and wherein the second lever is assigned to the second actuator. In this case, the first actuator is coupled by a first end to the vehicle body and by a second end to the intermediate lever of the joint arrangement. In an open position of the vehicle flap, during conventional operation, the extended first actuator, the vehicle body and the vehicle flap form, in a side view, a triangle so that lateral access to an engine compartment is made more difficult by the extended first actuator. This arrangement is a disadvantage with regard to possible repair work or maintenance of an engine and other various parts in an engine compartment of the vehicle.

SUMMARY

It is the object of the present disclosure to provide a drive device which is reliable and compact.

According to an aspect of the present disclosure, a drive device for a deployable vehicle flap is provided, comprising a flap part assigned to a vehicle flap, a body part assigned to a vehicle body, and a joint arrangement connecting the flap part and the body part in an articulated manner, wherein a first actuator is rotatably coupled to a coupling portion assigned to the joint arrangement for driving the flap part between a closed driving position and an open inspection position by operating the joint arrangement, wherein a second actuator is rotatably coupled to said coupling portion for lifting the flap part from said closed driving position to a pedestrian protection position, wherein the coupling portion comprises a first lever and a second lever, wherein said first lever is rotatably coupled to the first actuator, wherein said second lever is rotatably coupled to the second actuator, wherein the first lever and the second lever are connected to each other via a releasable mechanical retaining element, the releasable mechanical retaining element preventing the first lever to rotate with respect to the second lever, and wherein the second actuator is configured to break the releasable mechanical retaining element to allow the first lever to move with respect to the second lever upon expansion of the second actuator, such that an actuating force induced by the second actuator is decoupled from the first actuator.

According to an aspect of the present disclosure, a vehicle flap hinge arrangement is provided, comprising a flap portion assigned to a flap of a vehicle, a body portion assigned to a body of the vehicle, and a joint arrangement connecting the flap portion and the body portion in an articulated manner, wherein a first actuator is coupled to a coupling portion assigned to the joint arrangement for driving the flap portion between a closed driving position and an open inspection position by operating the joint arrangement, wherein a second actuator is coupled to said coupling portion for lifting the flap portion from said closed driving position to a pedestrian protection position, wherein the coupling portion comprises a first lever and a second lever, wherein said first lever is rotatably coupled to a pivotable member of the joint arrangement, wherein said second lever is rotatably coupled to said pivotable member of the joint arrangement, wherein said first lever is rotatably coupled to a distal end of the first actuator, wherein said second lever is rotatably coupled to a proximal end of the second actuator, wherein the first lever and the second lever are connected to each other via a shear rivet, the shear rivet preventing the first lever to move with respect to the second lever, and wherein the second actuator is configured to break the shear rivet to allow the first lever to disengage with respect to the second lever upon expansion of the second actuator, such that an actuating force induced by the second actuator is decoupled from the first actuator.

According to an aspect of the present disclosure, a drive device for a deployable vehicle flap is provided, comprising a flap part assigned to a vehicle flap, a body part assigned to a vehicle body, a joint arrangement connecting the flap part and the body part in an articulated manner. The drive device further comprises a first actuator coupled to the joint arrangement for opening and closing the vehicle flap during conventional operation, a second actuator coupled to the joint arrangement for lifting the vehicle flap into a pedestrian protection position, and a coupling device for coupling the first actuator and the second actuator. The coupling device comprises a first lever and a second lever, wherein the first lever is assigned to the first actuator, and wherein the second lever is assigned to the second actuator. The drive device is characterized in that, during conventional operation, the first lever and the second lever are connected to one another in a rotationally fixed manner via a mechanical securing element. Advantageously, the drive device is of compact design so that an installation space is optimally utilized and it is possible to achieve a free travel between the first actuator and the second actuator by releasing the connection of the two actuators that is formed by the mechanical securing element. Accordingly, the vehicle flap can advantageously always be abruptly and uniformly raised in a reliable manner via the drive device from a closed position into the pedestrian protection position in the event of a collision of the vehicle, for example with a pedestrian.

Expediently, the mechanical securing element comprises at least one predetermined breaking point. Advantageously, during conventional operation, opening and closing of the vehicle flap via the coupling device is possible with an intact mechanical securing element during conventional operation in a specific load range of the coupling device. An overload of the predetermined breaking point, preferably caused by the activation of the second actuator, immediately destroys the breaking point and thus creates a free travel between the first actuator and the second actuator, which is required for the unhindered deployment movement driven by the second actuator.

Expediently, the first lever is uncoupled from the second lever in the event of a breakage of the predetermined breaking point of the mechanical securing element. Advantageously, the coupling provided by the coupling device between the first actuator and the second actuator is at least partially eliminated above a certain load which leads to breaking of the predetermined breaking point. Consequently, a pivotability of the first lever and a pivotability of the second lever is made possible independently of one another. In this respect, no forces are transmitted from the first lever to the second lever, and thus, because the lever is decoupled via the broken predetermined breaking point, no forces are transmitted from the second actuator to the first actuator, and vice versa.

Preferably, the first lever is coupled to the first actuator in an articulated manner via a first connecting element. Preferably, there is a ball joint connection between the first lever and the first actuator. Particularly preferably, the first connecting element is configured as a ball socket or ball pivot. Advantageously, the first actuator is coupled to the first lever in an articulated manner allowing pivoting about a first articulation axis. The ball joint connection is advantageously robust, reliable and low noise.

Expediently, the first lever is coupled in an articulated manner about a first axis of rotation to the joint arrangement via a first joint. Preferably, the first axis of rotation is spaced apart from the first articulation axis about which the first actuator is pivotable. The first joint advantageously enables pivotability of the first lever during a transition of the vehicle flap into the pedestrian protection position. Furthermore, a defined first pivoting kinematics with respect to the first lever is advantageously specified via the first joint, which ensures a compact configuration of the drive device.

Preferably, the first joint is arranged between the mechanical securing element and the first connecting element during conventional operation with the vehicle flap closed. This arrangement of the first joint advantageously benefits the defined first pivoting kinematics of the first lever. Furthermore, the first lever is thereby configured to be small, compact and weight-reducing.

Expediently, the second lever is coupled to the second actuator in an articulated manner via a second connecting element. Preferably, there is a ball joint connection between the second lever and the second actuator. Particularly preferably, the second connecting element is configured as a ball socket or ball pivot. Advantageously, the second actuator is coupled to the second lever in an articulated manner allowing pivoting about a second articulation axis. The ball joint connection is advantageously robust, reliable and low noise.

Preferably, the second lever is coupled in an articulated manner about a second axis of rotation to the joint arrangement via a second joint. Preferably, the second axis of rotation is spaced apart from the second articulation axis about which the second actuator is pivotable. The second joint advantageously enables pivotability of the second lever during a transition of the vehicle flap into the pedestrian protection position. Furthermore, a defined second pivoting kinematics with respect to the second lever is advantageously specified via the second joint, which ensures a compact configuration of the drive device.

Expediently, the second joint is arranged between the mechanical securing element and the second connecting element during conventional operation with the vehicle flap closed. Advantageously, this arrangement of the second joint benefits the defined second pivoting kinematics of the second lever. Furthermore, the second lever is thereby configured to be small, compact and weight-reducing.

In a preferred embodiment of the drive device, the first lever comprises a first flat portion having a first eye, the second lever comprises a second flat portion having a second eye, wherein the first eye of the first lever and the second eye of the second lever are at least partially penetrated by the mechanical securing element during conventional operation. Advantageously, the first lever and the second lever are configured as flat parts so that the mechanical securing element has a relatively short length, thereby saving material and weight. Furthermore, the drive device is made more compact in this manner.

Overall, it is advantageous that, during conventional operation, the first flat portion of the first lever and the second flat portion of the second lever lie at least partially on top of one another and overlap in an overlapping region, wherein the first eye of the first lever and the second eye of the second lever are arranged in alignment in the overlapping region. Advantageously, the first lever and the second lever are arranged so as to lie closely against one another in order to ensure a compact design. In addition, the above arrangement reliably transmits shear forces to the mechanical securing element so that the drive device is configured to be safe and robust.

Preferably, the mechanical securing element is configured as a shear rivet. Advantageously, a desired destruction of a predetermined breaking point of the shear rivet provided in the shear rivet occurs at a defined shear force, so that the first lever and the second lever are no longer coupled to one another. Advantageously, different shear rivets with different predetermined breaking shear forces can be used in an assembly so that the coupling device can be easily and flexibly adapted to specific drive devices. Advantageously, a first end of the shear rivet is riveted to one of the first lever and the second lever on an outwardly facing side, and a second end of the shear rivet is riveted to the other of the first lever and the second lever on an outwardly facing side. Thereafter, the shear rivet is reliably secured within the first eye of the first lever and the second eye of the second lever against axial slipping out during conventional operation.

Expediently, the first lever of the coupling device is rotatable about the first axis of rotation during a transition to the pedestrian protection position. Advantageously, the coupling device allows the first lever to be pivoted about the first axis of rotation. In the event of a collision of a vehicle with, for example a pedestrian, shear forces act on the shear rivet of the coupling device, resulting in a break of the predetermined breaking point of the shear rivet. As a result, there is no longer a connection between the first lever and the second lever via the shear rivet, so that the first lever can advantageously pivot freely and independently with respect to the second lever about the first axis of rotation.

Expediently, the second lever of the coupling device is rotatable about the second axis of rotation during a transition to the pedestrian protection position. Advantageously, the coupling device allows the second lever to be pivoted about the second axis of rotation. In the event of a collision of a vehicle with, for example a pedestrian, shear forces act on the shear rivet of the coupling device, resulting in a break of the predetermined breaking point of the shear rivet. As a result, there is no longer a connection between the first lever and the second lever via the shear rivet, so that the second lever can advantageously pivot freely and independently with respect to the first lever about the second axis of rotation.

Preferably, the joint arrangement comprises a first end stop which can be brought into contact with the second lever of the coupling device after the predetermined breaking point of the mechanical securing element is broken. Advantageously, the second lever comprises an abutment surface on an outer circumferential portion, which abuts against the first end stop of the joint arrangement during a transition from conventional operation to the pedestrian protection position. Advantageously, a defined pivotability of the second actuator is thereby specified in that the first end stop acts as an abutment, so that an actuating force of the second actuator is predominantly used for abruptly raising the vehicle flap after the abutment surface of the second lever has come into contact with the first end stop. This advantageously ensures that the lifting movement into the pedestrian protection position can be performed safely and reliably by the second actuator.

According to a preferred embodiment, the joint arrangement comprises a first pivotable control arm having a first end and a second end and a second pivotable control arm having a first end and a second end. Advantageously, the first control arm and the second control arm are connected in an articulated manner as well as in a pivotable manner, thereby ensuring high mobility of the joint arrangement.

Preferably, it is provided that the first end of the first control arm is pivotally coupled to the body part via a first joint, and that the second end of the first control arm is pivotally coupled to an intermediate lever via a second joint. Advantageously, the first control arm of the joint arrangement is arranged in such a way that, on the one hand, the body part acts as an abutment with respect to the first control arm and, on the other hand, the intermediate lever is pivotably displaceable via the first control arm with a defined pivoting movement.

In an advantageous embodiment, it is provided that the first end of the second control arm is pivotally coupled to the body part via a third joint, and that the second end of the second control arm is pivotally coupled to an intermediate lever via a fourth joint. Advantageously, the second control arm of the joint arrangement is arranged in such a way that, on the one hand, the body part acts as an abutment with respect to the second control arm and, on the other hand, the intermediate lever is pivotably displaceable via the second control arm with a defined pivoting movement.

According to a preferred embodiment, the joint arrangement comprises a four-bar linkage formed by the first and second joints of the first control arm and the third and fourth joints of the second control arm. Four-bar linkages are preferably used for complex movement sequences. In this case, the four-bar linkage is characterized in that stable and harmonious movements can advantageously be carried out with respect to the joint arrangement. Furthermore, four-bar linkages are reliable, robust and compact.

The second actuator is expediently configured as a pyrotechnic actuator. Advantageously, in the event of a collision or in the event of an immediately imminent collision, sensors of the vehicle activate the second actuator so that an explosive charge is ignited, wherein the vehicle flap is directly displaced abruptly and promptly in a direction away from the vehicle body and, in particular, away from the underlying motor block.

According to a preferred embodiment, the first actuator is configured as a spindle drive. The first actuator enables a reliable and uniform opening and closing of the vehicle flap during conventional operation. In this case, the opening or closing of the vehicle flap may be automatically driven and controlled, for example, by a remote control. In addition, the first actuator reliably and safely holds the open vehicle flap in an open position, preventing it from falling on a person during vehicle maintenance.

According to an alternative embodiment, the first actuator is configured as a gas pressure spring. The first actuator serves to open and close the vehicle flap during conventional operation. In this case, the vehicle flap is either opened or closed manually, wherein the gas pressure spring supports a movement of the vehicle flap, and wherein the gas pressure spring holds the opened vehicle flap in an open position so that it does not fall down on a person during maintenance of the vehicle. Advantageously, a gas pressure spring is both economical and easy to install.

Further advantages, characteristics, features and developments of the present disclosure will emerge from the following description of a preferred exemplary embodiment.

BRIEF SUMMARY OF THE DRAWINGS

The present disclosure is explained in more detail below with reference to the accompanying drawings.

DETAILED DESCRIPTION

Figure 1:
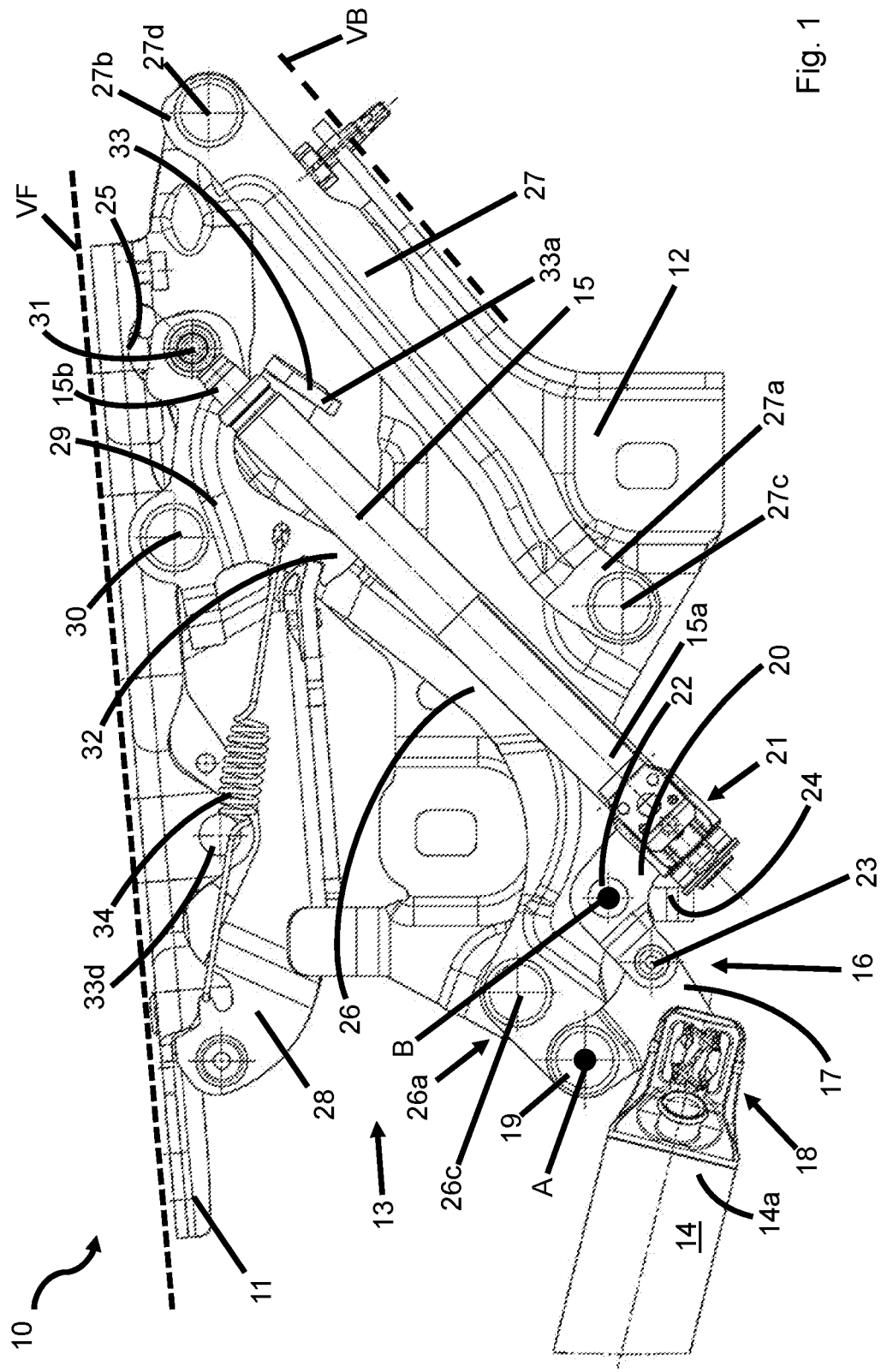
FIG. 1 shows a side view of an exemplary embodiment of a drive device in a closed conventional state of the vehicle flap.

FIG. 1 shows a side view of an exemplary embodiment of a drive device 10 having a joint arrangement 13 for an openable vehicle flap VF of a vehicle with a vehicle body VB, during conventional operation, wherein the vehicle flap VF in FIG. 1 is completely closed or locked. The joint arrangement 13 is arranged between the vehicle flap VF and the vehicle body VB, so that the vehicle flap VF can be pivoted and/or lifted relative to the vehicle body VB via the joint arrangement 13. Both the vehicle flap VF, which in this exemplary embodiment is a front hood, and the vehicle body VB are each shown as a dashed line for the sake of clarity.

To ensure safe and reliable opening and closing of the vehicle flap VF in conventional operation, the drive device 10 comprises a first actuator 14 having a first end 14a and a second end (not shown here). In this exemplary embodiment, the first actuator 14 is a linear actuator configured as a spindle drive. The first actuator 14 automatically opens and closes, e.g., by remote control, the vehicle flap VF for maintenance and servicing of an engine and peripheral devices of the vehicle. The second end (not shown) of the first actuator 14, which is opposite to the first end 14a, is pivotally coupled to the vehicle flap VF. The first end 14a of the first actuator 14 is coupled to the joint arrangement 13 via a first connecting element 18 which is configured as a ball socket, and is connected to the first end 14a of the first actuator 14. A coupling device 16 with a first lever 17 is arranged between the joint arrangement 13 and the first connecting element 18, wherein the first connecting element 18 is coupled to the first lever 17 in an articulated manner.

Furthermore, the drive device 10 comprises a second actuator 15 having a first end 15a and a second end 15b, which actuator is configured as a pyrotechnic actuator. In addition to the conventional opening and closing of the vehicle flap VF during conventional operation via the first actuator 14, the second actuator 15 is activated via sensors in the event of a collision or an immediately imminent collision of the vehicle with a pedestrian or with a cyclist, so that the vehicle flap VF is immediately and abruptly raised several centimeters away from the vehicle body VB by means of the telescopic second actuator 15.

In this case, the vehicle flap VF is uniformly raised on a side of the vehicle facing the windshield (not shown for reasons of clarity) of the vehicle, so that the vehicle flap VF is in a pedestrian protection position. Accordingly, the vehicle comprises a drive device 10 for the vehicle flap VF, as shown in FIG. 1, both on the driver's side and on the passenger's side, so that the vehicle flap VF can be uniformly opened or closed via the first actuator 14 during conventional operation and can be uniformly and abruptly raised into the pedestrian protection position via the second actuator 15 in the event of a collision.

A flap part 11 is connected to an underside of the vehicle flap VF, which forms a first hinge part of a vehicle hinge. A body part 12, which forms a second hinge part of the vehicle hinge, is arranged on a side opposite the flap part 11. The body part 12 is fixedly connected to the vehicle body VB, in particular by riveting.

The flap part 11 and the body part 12 are coupled to one another in an articulated manner via the joint arrangement 13 with a first pivotable control arm 26 and with a second pivotable control arm 27 via an intermediate lever 28. The joint arrangement 13 corresponds in this case to a four-bar linkage system.

The first control arm 26 comprises a first end 26a and a second end 26b. Furthermore, the second control arm 27 comprises a first end 27a and a second end 27b visible in FIG. 6. In this case, the first end 26a of the first control arm 26 is pivotally coupled to the body part 12 by a first joint 26c. The second end 26b (shown in FIG. 6 but covered in FIG. 1) of the first control arm 26, is coupled to the intermediate lever 28 by a second joint 26d. In addition, the first control arm 26 comprises an outgoing protrusion at its first end 26a which serves as a first end stop 24 with respect to a second lever 20 of the coupling device 16 coupled to the joint arrangement 13.

The first end 27a of the second control arm 27 is coupled to the body part 12 by a third joint 27c, and the second end 27b of the second control arm 27 is coupled to the intermediate lever 28 by a fourth joint 27d.

Figure 3:
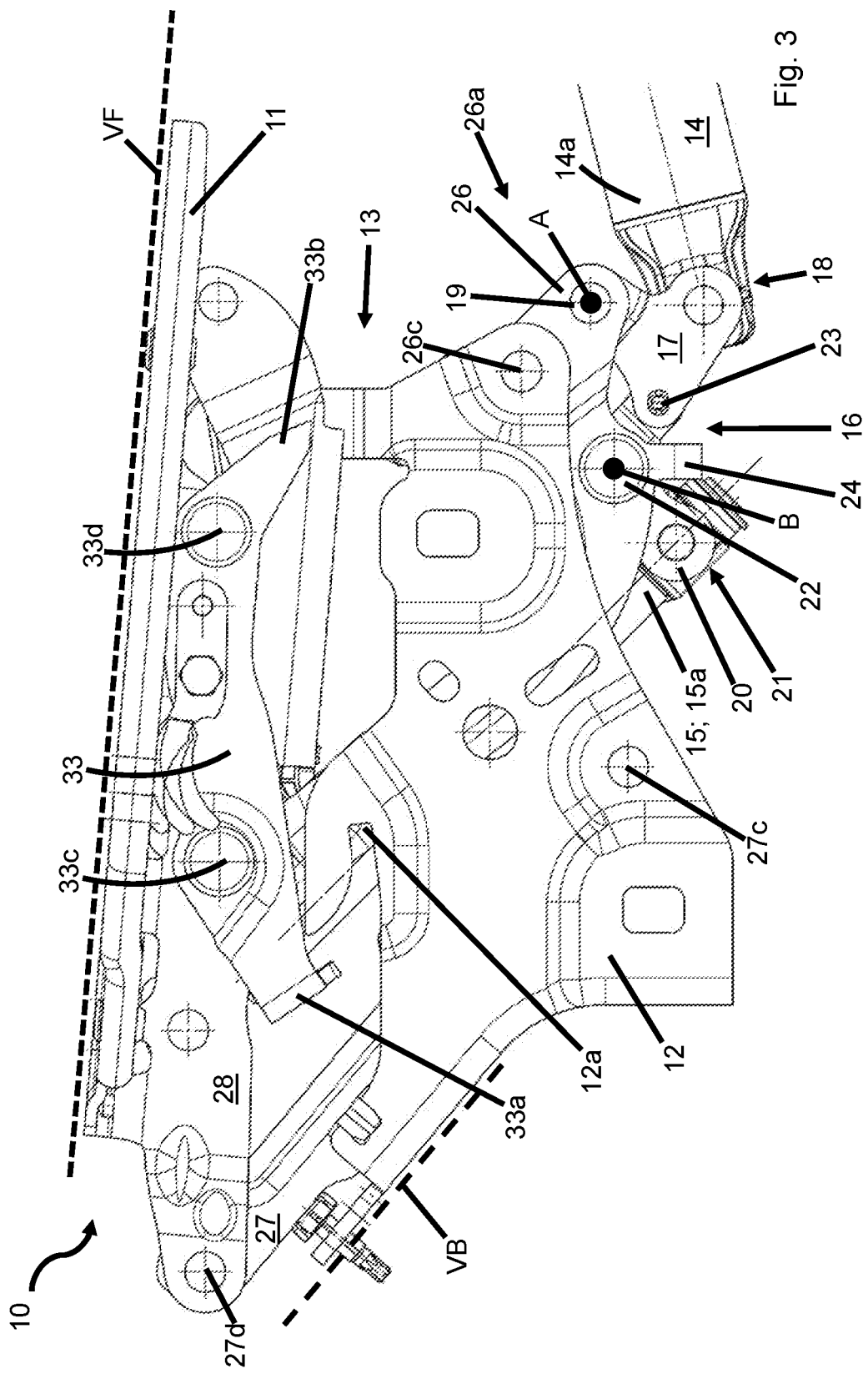
FIG. 3 shows a rear view of the drive device from FIG. 1.

Furthermore, a stop lever 33 having a first end 33a and a second end 33b shown in FIG. 3 is arranged behind the intermediate lever 28 in FIG. 1. The stop lever 33 is coupled in an articulated manner to the intermediate lever 28 by a first joint 33c shown in FIG. 3 and to the flap part 11 by a second joint 33d, which is shown in FIG. 3. In FIG. 1, only the first end 33a formed as a locking hook and the second joint 33d of the stop lever 33 are visible.

A locking lever 29 is coupled in an articulated manner to the flap part 11 via a first joint 30, wherein the locking lever 29 is preloaded into a locking position by means of a tension spring 34 during conventional operation, as shown in FIG. 1. In this case, the tension spring 34 is connected at one end to the flap part 11 and at the other end to the locking lever 29 so that the locking lever 29 is preloaded against an outer surface portion of the intermediate lever 28 by a tensile force of the tension spring 34 with a hook-like projection 32 provided on the locking lever 29.

The second actuator 15 is pivotally coupled at its second end 15b to the locking lever 29 via a second joint 31 of the locking lever 29, wherein the flap part 11 comprises a cutout for a second end stop 25 corresponding to the second joint 31 and to the second end 15b of the second actuator 15, with which the second end 15b of the second actuator 15 can be brought into contact in order to transmit and initiate a required deployment force by the second actuator 15 to the flap part 11 and thus to the vehicle flap VF during contact with the positive fitting second end stop 25.

A second connecting element 21 is connected to the first end 15a of the second actuator 15, which in turn is pivotally coupled to the second lever 20. Thus, the first actuator 14 is coupled at its first end 14a to the first lever 17, and the second actuator 15 is coupled at its first end 15a to the second lever 20 of the coupling device 16.

The first lever 17 is pivotally connected to the first control arm 26 by a first joint 19. Furthermore, the second lever 20 is pivotally connected to the first control arm 26 by a second joint 22. By means of the aforementioned coupling device 16, the first lever 17 comprises, on the one hand, a first axis of rotation A assigned to the first actuator 14. On the other hand, the second lever 20 comprises a second axis of rotation B assigned to the second actuator 15. Both the first axis of rotation A and the second axis of rotation B are arranged orthogonally with respect to the plane of the side view of FIG. 1, so that both axes of rotation A and B are each shown as a point.

During conventional operation of the drive device 10, the first lever 17 and the second lever 20 are coupled to one another by means of an integrated mechanical securing element 23 of the coupling device 16. The mechanical securing element 23 is configured as a shear pin with a predetermined breaking point. In this case, the first lever 17 comprises a first eye and the second lever 20 comprises a second eye. The first lever 17 and the second lever 20 partially overlap in such a way that the first eye and the second eye are aligned, so that the shear pin can be inserted simultaneously into the two mutually aligned eyes and thus passes through both the first eye and the second eye, so that the first lever 17 and the second lever 20 are coupled to one another in a rotationally fixed manner via the mechanical securing element 23.

In this exemplary embodiment, during conventional operation of the drive device 10, the shear pin is configured as a shear rivet. In this respect, the shear rivet is riveted at one end to the first lever 17 in an assembled state. At the other end, the shear rivet is riveted to the second lever 20 in an assembled state, wherein both ends of the shear rivet are plastically deformed. Consequently, the riveted shear rivet is secured against axial slipping out of the first lever 17 and out of the second lever 20.

Figure 2:
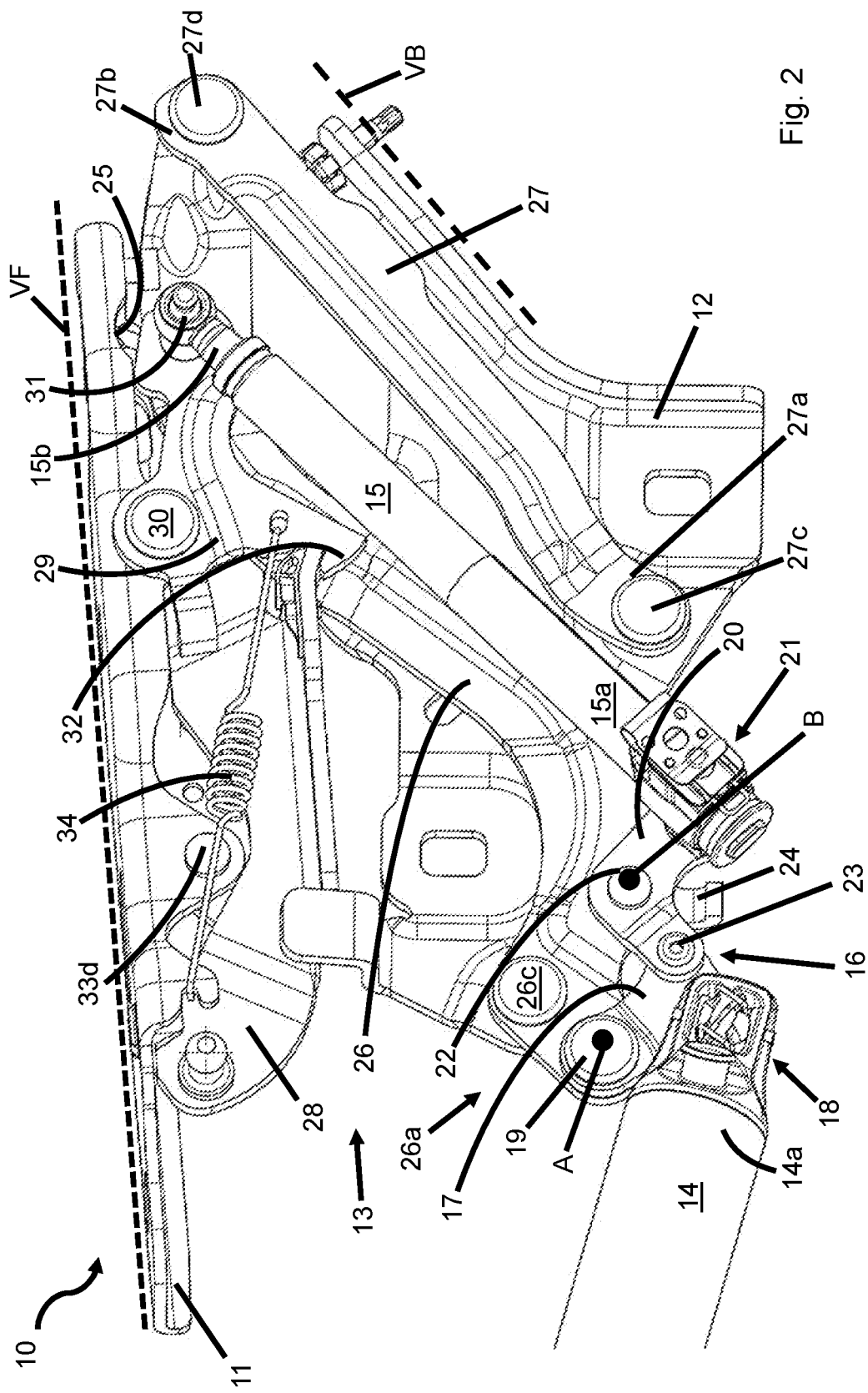
FIG. 2 shows a perspective view of the drive device from FIG. 1.

FIG. 2 shows the drive device 10 according to FIG. 1 in a perspective view during conventional operation, wherein in particular the first end stop 24 is clearly visible. The first end stop 24 is a nose-like projection of the first control arm 26. The first end stop 24 is arranged below the second joint 22 of the second lever 20.

FIG. 3 shows the drive device 10 according to FIG. 1 in a rear view during conventional operation. In particular, the first connecting element 18 connected to the first end 14*a* of the first actuator 14 for pivotally connecting the first lever 17 to the first actuator 14, and the second connecting element 21 connected to the first end 15*a* of the second actuator 15 for the connecting of the second lever 20 to the second actuator 15 are now visible. Furthermore, a rear side of the mechanical securing element 23 is visible, which completely penetrates both the first lever 17 and the second lever 20 and thus connects them to one another in a rotationally fixed manner.

Furthermore, the stop lever 33 is arranged below the flap part 11 in a position horizontal in the longitudinal direction thereof, wherein the stop lever 33 is coupled to the intermediate lever 28 via a first joint 33*c*, and wherein the stop lever 33 is coupled to the flap part 11 via a second joint 33*d*. Furthermore, the body part 12 comprises a cutout 12*a* in which the first end 33*a* of the stop lever 33 is engageable.

Figure 4:
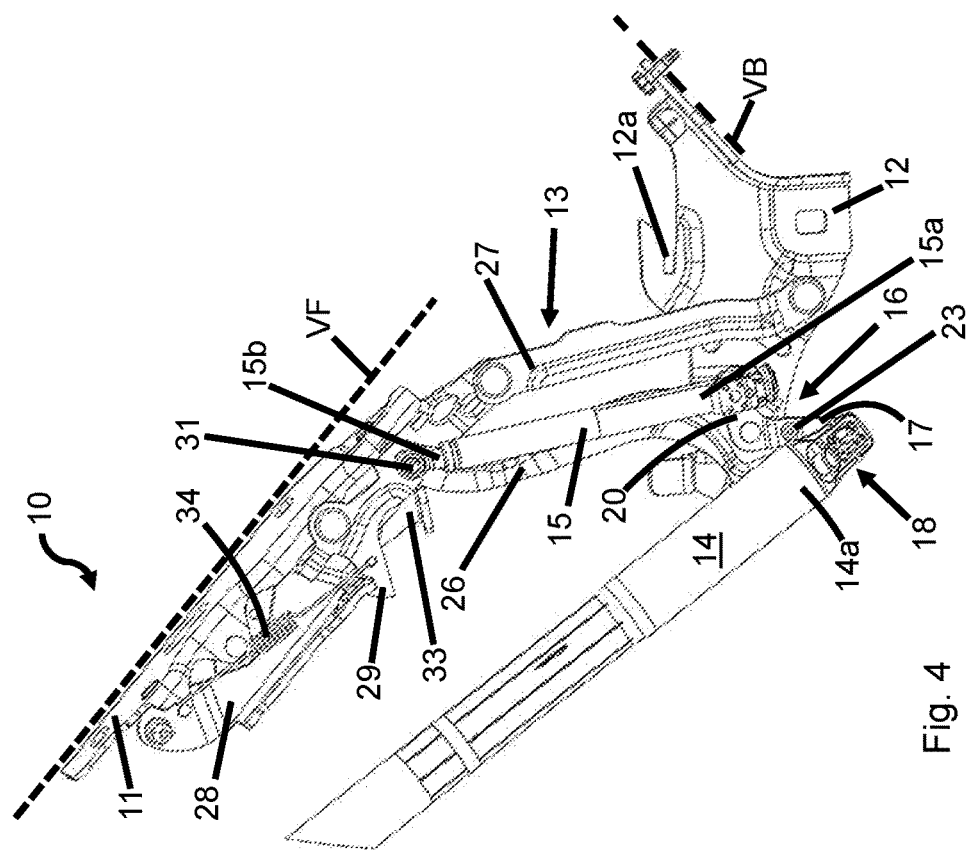
FIG. 4 shows a side view of an exemplary embodiment of a drive device in an open conventional state.

FIG. 4 shows a side view of the drive device 10 during conventional operation with the vehicle flap VF open. A conventional opening as well as a conventional closing of the vehicle flap VF is performed by the first actuator 14, which is telescopic and fully extended for opening the vehicle flap VF. During conventional operation, the first lever 17 and the second lever 20 are coupled together in a rotationally fixed manner by the mechanical securing element 23.

Furthermore, during conventional operation, the first actuator 14 is arranged almost parallel with respect to the opened vehicle flap VF, so that lateral access for a user is possible without hindrance when the vehicle flap VF is open. Thus, repair or maintenance of the motor and/or further parts in an engine compartment is not impeded by the extended first actuator 14.

Because the first lever 17, the second lever 20 and the second actuator 15 are fixedly connected to the first control arm 26 of the joint arrangement 13 during conventional operation, the first lever 17, the second lever 20 and the second actuator 15 pivot simultaneously and uniformly with the first control arm 26 during an opening movement or during a closing movement of the vehicle flap VF.

During conventional operation, the first lever 17 and the second lever 20 are practically formed as a single-piece extension of the first control arm 26, since the first lever 17 and the second lever 20 are completely coupled to one another in a rotationally fixed manner via the mechanical securing element 23, as well as coupled to the first control arm 26 via the two joints 19 and 22, as shown in FIG. 1.

The second actuator 15 is passively displaced during a convnetional movement of the vehicle flap VF without any activation of the second actuator 15. Accordingly, the opening and closing movement of the vehicle flap VF during conventional operation does not lead to the destruction of the mechanical securing element 23 and therefore does not lead to the release of the coupling between the first end 14*a* of the first actuator 14 and the second end 15*a* of the second actuator 15 achieved by the coupling device 16.

Figure 5:
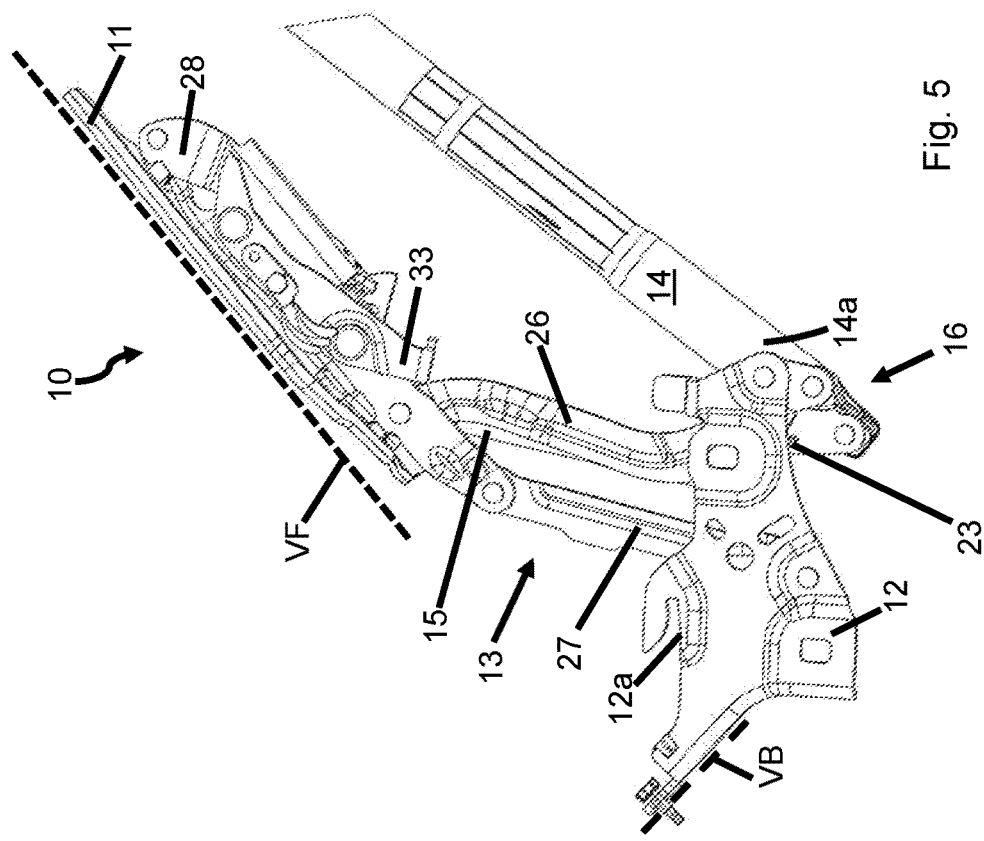
FIG. 5 shows a rear view of the drive device from FIG. 4.

FIG. 5 shows a rear view of the drive device 10 according to FIG. 4 with an open vehicle flap VF during conventional operation. In FIG. 4 and FIG. 5 it can be clearly seen that the flap part 11 is pivoted upwards together with the intermediate lever 28 as well as with the locked locking lever 29 and the stop lever 33. During conventional operation, the intermediate lever 28 and the stop lever 33 always remain essentially parallel to the flap part 11.

Figure 6:
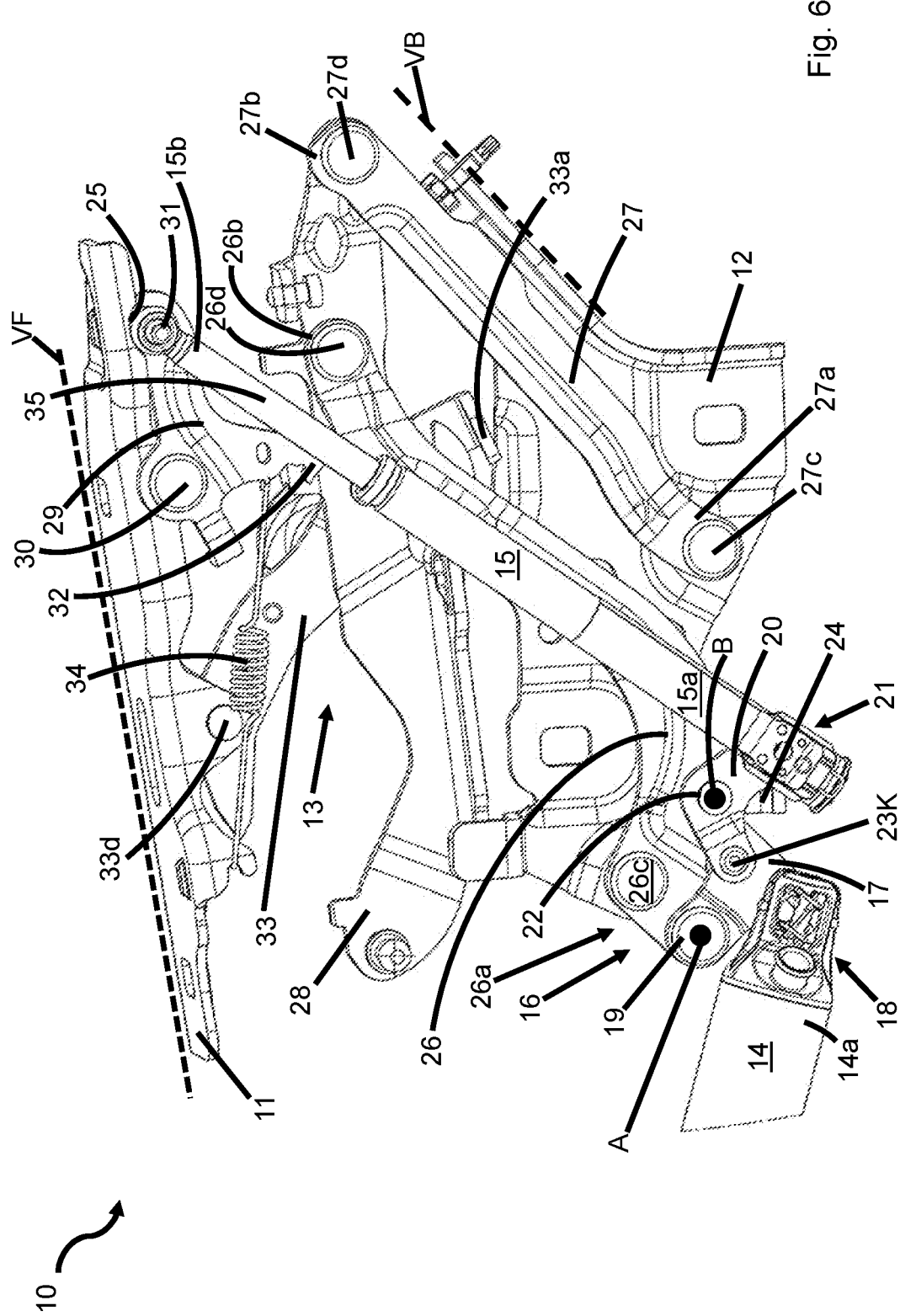
FIG. 6 shows a side view of an exemplary embodiment of a drive device in a raised pedestrian protection position.

FIG. 6 shows a side view of an exemplary embodiment of the drive device 10 in a so-called pedestrian protection position with a raised vehicle flap VF and a destroyed, no longer functioning mechanical securing element 23K, wherein the first end 14*a* of the first actuator 14 and the second end 15*a* of the second actuator 15 are now decoupled. The pedestrian protection position of the vehicle flap VF can be automatically activated by sensors exclusively in the event of a collision or an immediately imminent collision of the vehicle with a pedestrian or with a cyclist.

In the event of a collision, corresponding sensors activate the second actuator 15, which comprises a pyrotechnic propellant. This pyrotechnic propellant is then immediately ignited so that the telescopic second actuator 15 abruptly extends a guide tube 35 so that the second end 15*b* of the second actuator 15 strikes the second end stop 25 of the flap part 11 via the second joint 31. As a result, the flap part 11 is displaced upward by means of a deployment force of the second actuator 15. Accordingly, the vehicle flap VF is abruptly raised in a region facing the windshield side of the vehicle.

In order to ensure that the first actuator 14 does not cause a blockage during this abrupt deployment movement of the vehicle flap VF, which would impede the deployment movement of the vehicle flap VF, the mechanical securing element 23 comprises a predetermined breaking point. The deployment force of the second actuator 15, which acts, inter alia, on the mechanical securing element 23, exceeds the required shear force necessary to break the predetermined breaking point, so that the mechanical securing element 23 is destroyed by the second actuator 15 as a result of the rapidly occurring large forces.

As a result, after the mechanical securing element 23K has broken, the first lever 17 and the second lever 20 of the coupling device 16 are now decoupled, so that the first lever 17 can be pivoted about the first axis of rotation A and the second lever 20 can be pivoted about the second axis of rotation B. Thus, in a transition to the pedestrian protection position, the first actuator 14 is pivotally displaceable about the first axis of rotation A, and the second actuator 15 is pivotally displaceable about the second axis of rotation B independently of the first actuator 14 in a transition to the pedestrian protection position.

A pivotability of the first actuator 14 now occurs independently of a pivotability of the second actuator 15. The first actuator 14 and the second actuator 15 are thus decoupled from each other from the moment of a transition to the pedestrian protection position, since no intact mechanical securing element 23K any longer couples the first lever 17 and the second lever 20 to each other in a rotationally fixed manner.

Figure 7:
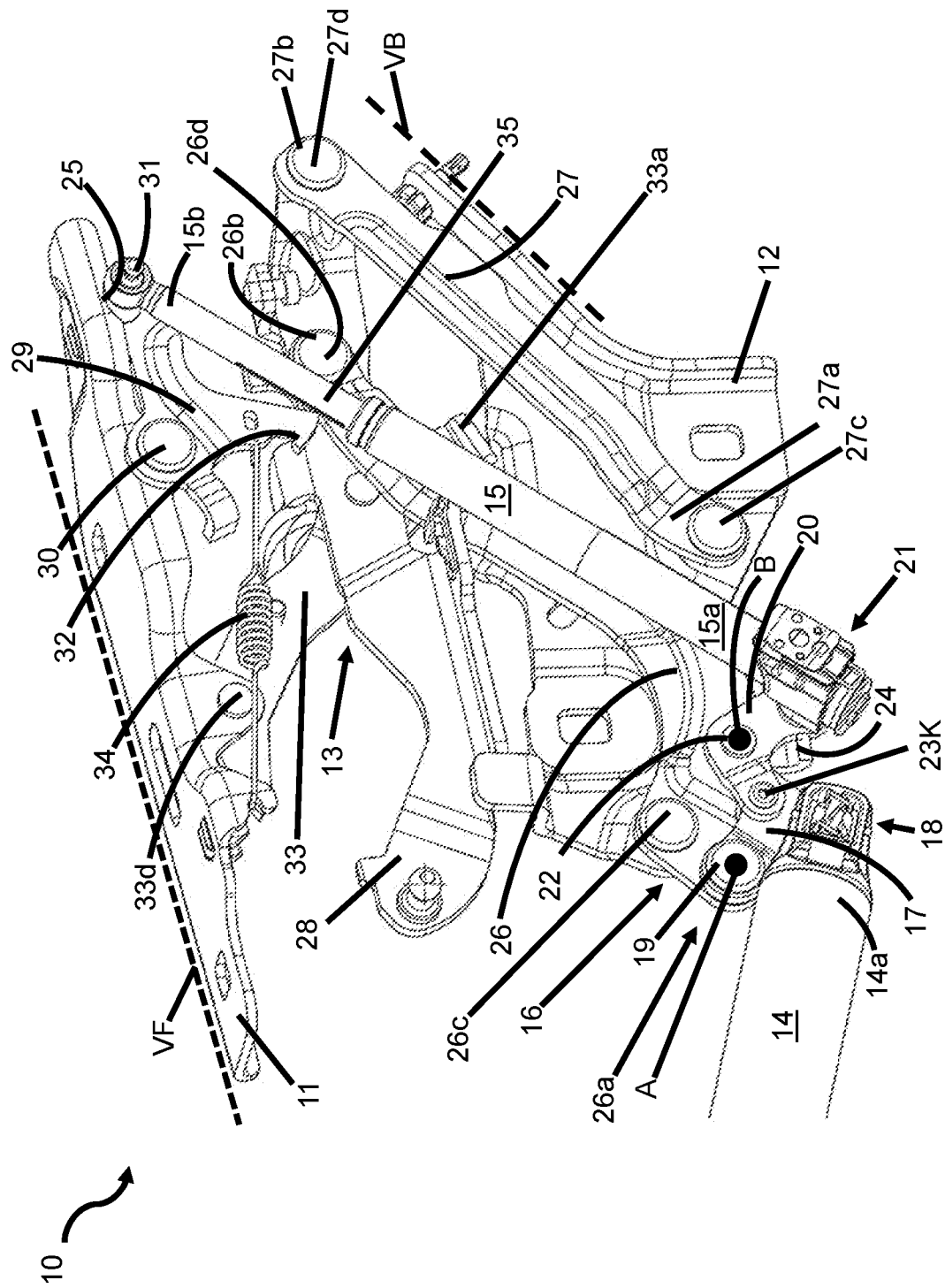
FIG. 7 shows a perspective view of the drive device from FIG. 6.

FIG. 7 shows the drive device 10 corresponding to FIG. 6 in a perspective view in the pedestrian protection position. In FIG. 7, it can be clearly seen that in the pedestrian protection position, the second lever 20 abuts against the first end stop 24 of the first control arm 26 with an outer circumferential portion, thereby preventing further pivoting of the second lever 20 or of the second actuator 15 about the second axis of rotation B in a clockwise direction. As a result, the first end stop 24 acts as an abutment so that the second actuator 15 can reliably lift the vehicle flap VF without delay. Advantageously, the intermediate lever 28 remains unmoved in its original horizontal position during a deployment movement of the vehicle flap VF by the second actuator 15, so that advantageously no unnecessary weight has to be displaced in the event of a collision. Furthermore, the deployment force of the second actuator 15 causes the locking lever 29 first to be pivoted out of the locking position and then also to be displaced at the second end 15b by the second actuator 15.

Figure 8:
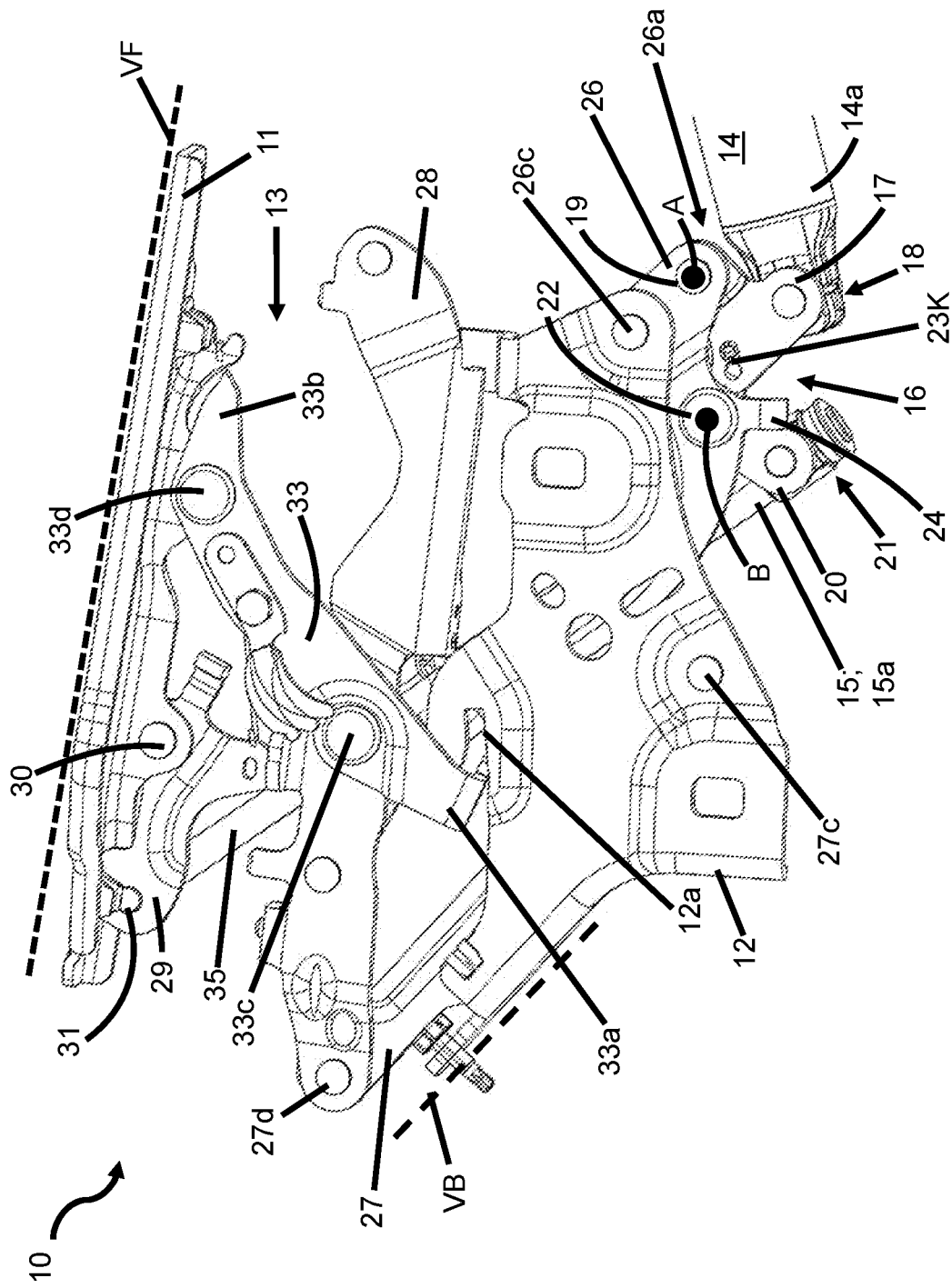
FIG. 8 shows a rear view of the drive device from FIG. 6.

FIG. 8 shows a rear view of the drive device 10 corresponding to FIG. 6 in the pedestrian protection position with a destroyed mechanical securing element 23K. In order to provide the raised vehicle flap VF with sufficient stability, for example in the event of an impact of a pedestrian on the vehicle flap VF, in the pedestrian protection position the stop lever 33 is pivoted into a substantially vertical position so that the first end 33a of the stop lever 33 engages in the cutout 12a of the body part 12 and abuts there. The vehicle flap VF is thus jacked up with respect to the vehicle body VB via the stop lever 33.

Furthermore, the destroyed mechanical securing element 23K is now clearly visible in FIG. 8, as a result of which an independent pivotability of the first lever 17 and of the second lever 20 is ensured. As a result, the first actuator 14 has no influence on the abrupt deployment movement of the second actuator 15, so that the vehicle flap VF can be moved immediately and reliably into the pedestrian protection position.

In addition, it can be clearly seen in FIG. 8 that the second lever 20 abuts against the first end stop 24 of the first control arm 26 so that the deployment force of the telescopic second actuator 15 can be reliably transmitted to the flap part 11 or to the vehicle flap VF.

The function of the present disclosure is to provide a compact and reliable drive device 10 for a vehicle flap VF, which serves to open and close the vehicle flap VF during conventional operation, and which further, in the event of a collision of the vehicle, moves the vehicle flap VF to the pedestrian protection position in a timely, immediate and abrupt manner.

In order to enable a timely and abrupt raising of the vehicle flap VF, so that, for example, a pedestrian can already hit the raised vehicle flap VF in case of a collision with the vehicle, the first lever 17 is decoupled from the second lever 20 of the coupling device 16.

During conventional operation, the first end 14a of the first actuator 14 is coupled to the second end 15a of the second actuator 15 via the coupling device 16. The coupling device 16 comprises a first lever 17 and a second lever 20. In this case, the first actuator 14 is connected in an articulated manner to the first lever 17 and the second actuator 15 is connected in an articulated manner to the second lever 20.

During conventional operation, both the first lever 17 and the second lever 20 are coupled to one another via the mechanical securing element 23. The mechanical securing element 23 is configured as a shear rivet with a predetermined breaking point which is immediately destroyed at a defined shear force and thus releases the rotationally fixed connection between the first lever 17 and the second lever 20.

As a result, the ruptured predetermined breaking point of the mechanical securing element 23K releases an independent pivotability of the first end 14a of the first actuator 14 and of the first end 14a of the first actuator 14 by the second actuator 15 generating a sufficiently high shear force due to its abrupt deployment movement in order to destroy the intact mechanical securing element 23 as a result of a shearing movement. Advantageously, the independent pivotability of the second actuator 15 causes a prompt and abrupt raising of the vehicle flap VF without the first actuator 14 negatively influencing the deployment movement. Furthermore, damage to the first actuator 14 during a transition of the vehicle flap VF into the pedestrian protection position is advantageously excluded, since the first lever 17 is completely decoupled from the second lever 20 via the destroyed predetermined breaking point of the mechanical securing element 23K of the coupling device 16.

The present disclosure has been explained above with reference to an exemplary embodiment in which the second end of the first actuator 14 was coupled to the vehicle flap so that the second end of the first actuator is pivoted together with the end of the vehicle flap facing away from the windshield. It has to be understood that the second end of the first actuator may alternatively be coupled to the vehicle body.

What is claimed is:

1. A drive device for a deployable vehicle flap, comprising
a flap part assigned to a vehicle flap;
a body part assigned to a vehicle body;
a joint arrangement connecting the flap part and the body part in an articulated manner;
a first actuator coupled to the joint arrangement for opening and closing the vehicle flap during conventional operation;
a second actuator coupled to the joint arrangement for lifting the vehicle flap into a pedestrian protection position; and
a coupling device for coupling the first actuator and the second actuator,
wherein the coupling device comprises a first lever and a second lever,
wherein said first lever is assigned to the first actuator,
wherein said second lever is assigned to the second actuator,
wherein during conventional operation the first lever and the second lever are connected to one another in a rotationally fixed manner via a mechanical securing element.

2. The drive device according to claim 1, wherein the mechanical securing element comprises at least one predetermined breaking point.

3. The drive device according to claim 2, wherein the first lever is uncoupled from the second lever in the event of a breakage of the predetermined breaking point of the mechanical securing element.

4. The drive device according to claim 1, wherein the first lever is coupled to the first actuator in an articulated manner via a first connecting element.

5. The drive device according to claim 4, wherein the first lever is coupled in an articulated manner about a first axis of rotation to the joint arrangement via a first joint.

6. The drive device according to claim 5, wherein the first joint is arranged between the mechanical securing element and the first connecting element during conventional operation with the vehicle flap closed.

7. The drive device according to claim 5, wherein the first lever of the coupling device is rotatable about the first axis of rotation during a transition to the pedestrian protection position.

8. The drive device according to claim 1, wherein the second lever is coupled to the second actuator in an articulated manner via a second connecting element.

9. The drive device according to claim 8, wherein the second lever is coupled in an articulated manner about a second axis of rotation to the joint arrangement via a second joint.

10. The drive device according to claim 9, wherein the second joint is arranged between the mechanical securing element and the second connecting element during conventional operation with the vehicle flap closed.

11. The drive device according to claim 9, wherein the second lever of the coupling device is rotatable about the second axis of rotation during a transition to the pedestrian protection position.

12. The drive device according to claim 1, wherein the first lever comprises a first flat portion having a first eye, wherein the second lever comprises a second flat portion having a second eye, wherein the first eye of the first lever and the second eye of the second lever are at least partially penetrated by the mechanical securing element during conventional operation.

13. The drive device according to claim 12, wherein during conventional operation the first flat portion of the first lever and the second flat portion of the second lever lie at least partially on top of one another and overlap in an overlapping region, wherein the first eye of the first lever and the second eye of the second lever are arranged in alignment in the overlapping region.

14. The drive device according to claim 1, wherein the mechanical securing element is configured as a shear rivet.

15. The drive device according to claim 2, wherein the joint arrangement comprises a first end stop which can be brought into contact with the second lever of the coupling device after the predetermined breaking point of the mechanical securing element is broken.

16. The drive device according to claim 1, wherein the joint arrangement comprises a first pivotable control arm having a first end and a second end and a second pivotable control arm having a first end and a second end.

17. The drive device according to claim 16, wherein the first end of the first control arm is pivotally coupled to the body part via a first joint, wherein the second end of the first control arm is pivotally coupled to an intermediate lever via a second joint.

18. The drive device according to claim 17, wherein the first end of the second control arm is pivotally coupled to the body part via a third joint, wherein the second end of the second control arm is pivotally coupled to an intermediate lever via a fourth joint.

19. The drive device according to claim 18, wherein the joint arrangement comprises a four-bar linkage formed by the first and second joints of the first control arm and the third and fourth joints of the second control arm.

20. The drive device according to claim 1, wherein the second actuator is configured as a pyrotechnic actuator.

21. A drive device for a deployable vehicle flap, comprising
a flap part assigned to a vehicle flap;
a body part assigned to a vehicle body;
a joint arrangement connecting the flap part and the body part in an articulated manner;
a first actuator rotatably coupled to a coupling portion assigned to the joint arrangement for driving the flap part between a closed driving position and an open inspection position by operating the joint arrangement;
a second actuator is rotatably coupled to said coupling portion for lifting the flap part from said closed driving position to a pedestrian protection position,
wherein the coupling portion comprises a first lever and a second lever,
wherein said first lever is rotatably coupled to the first actuator,
wherein said second lever is rotatably coupled to the second actuator,
wherein the first lever and the second lever are connected to each other via a releasable mechanical retaining element, the releasable mechanical retaining element preventing the first lever to rotate with respect to the second lever, and
wherein the second actuator is configured to break the releasable mechanical retaining element to allow the first lever to move with respect to the second lever upon expansion of the second actuator, such that an actuating force induced by the second actuator is decoupled from the first actuator.

22. A vehicle flap hinge arrangement, comprising
a flap portion assigned to a flap of a vehicle;
a body portion assigned to a body of the vehicle;
a joint arrangement connecting the flap portion and the body portion in an articulated manner;
a first actuator coupled to a coupling portion assigned to the joint arrangement for driving the flap portion between a closed driving position and an open inspection position by operating the joint arrangement; and
a second actuator coupled to said coupling portion for lifting the flap portion from said closed driving position to a pedestrian protection position,
wherein the coupling portion comprises a first lever and a second lever,
wherein said first lever is rotatably coupled to a pivotable member of the joint arrangement,
wherein said second lever is rotatably coupled to said pivotable member of the joint arrangement,
wherein said first lever is rotatably coupled to a distal end of the first actuator,
wherein said second lever is rotatably coupled to a proximal end of the second actuator,
wherein the first lever and the second lever are connected to each other via a shear rivet, the shear rivet preventing the first lever to move with respect to the second lever, and
wherein the second actuator is configured to break the shear rivet to allow the first lever to disengage with respect to the second lever upon expansion of the second actuator, such that an actuating force induced by the second actuator is decoupled from the first actuator.

* * * * *